Nov. 12, 1929.   J. T. T. RANDLES ET AL   1,735,443
CONVEYER SYSTEM
Filed Jan. 17, 1929   4 Sheets-Sheet 4
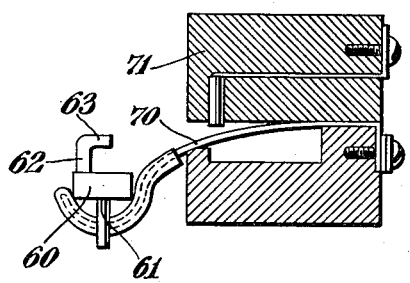
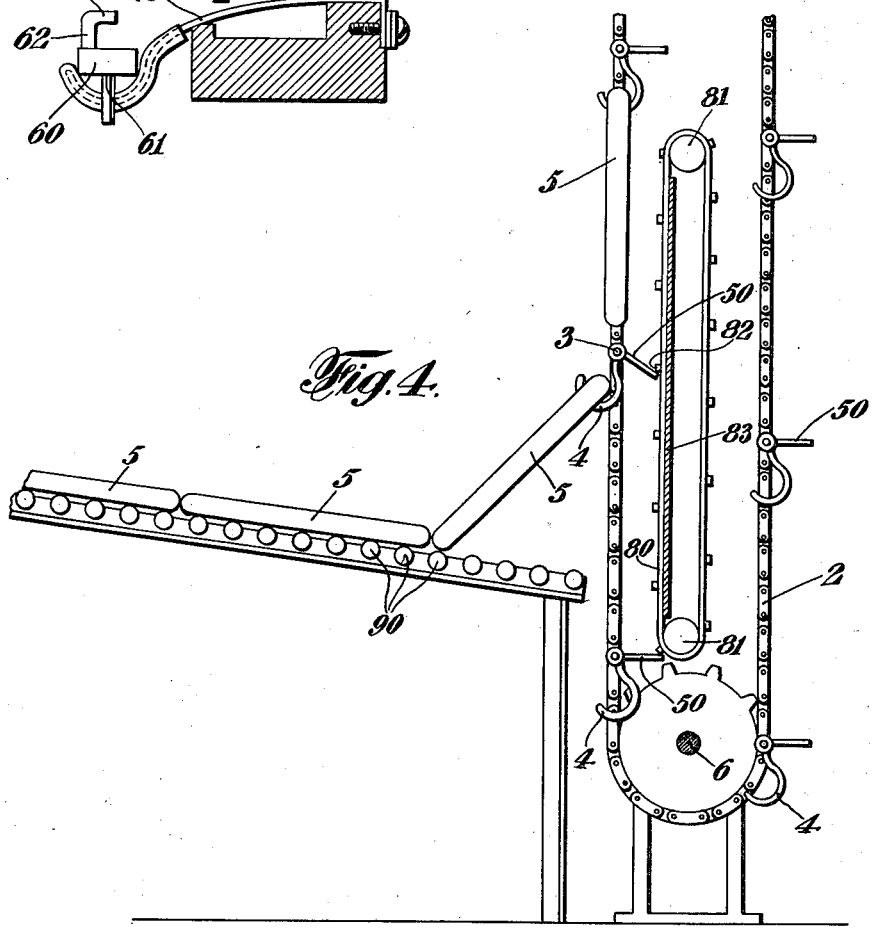
INVENTORS
John T. Randles
Harry Willshaw
Harold Smith
ATTORNEY Patented Nov. 12, 1929

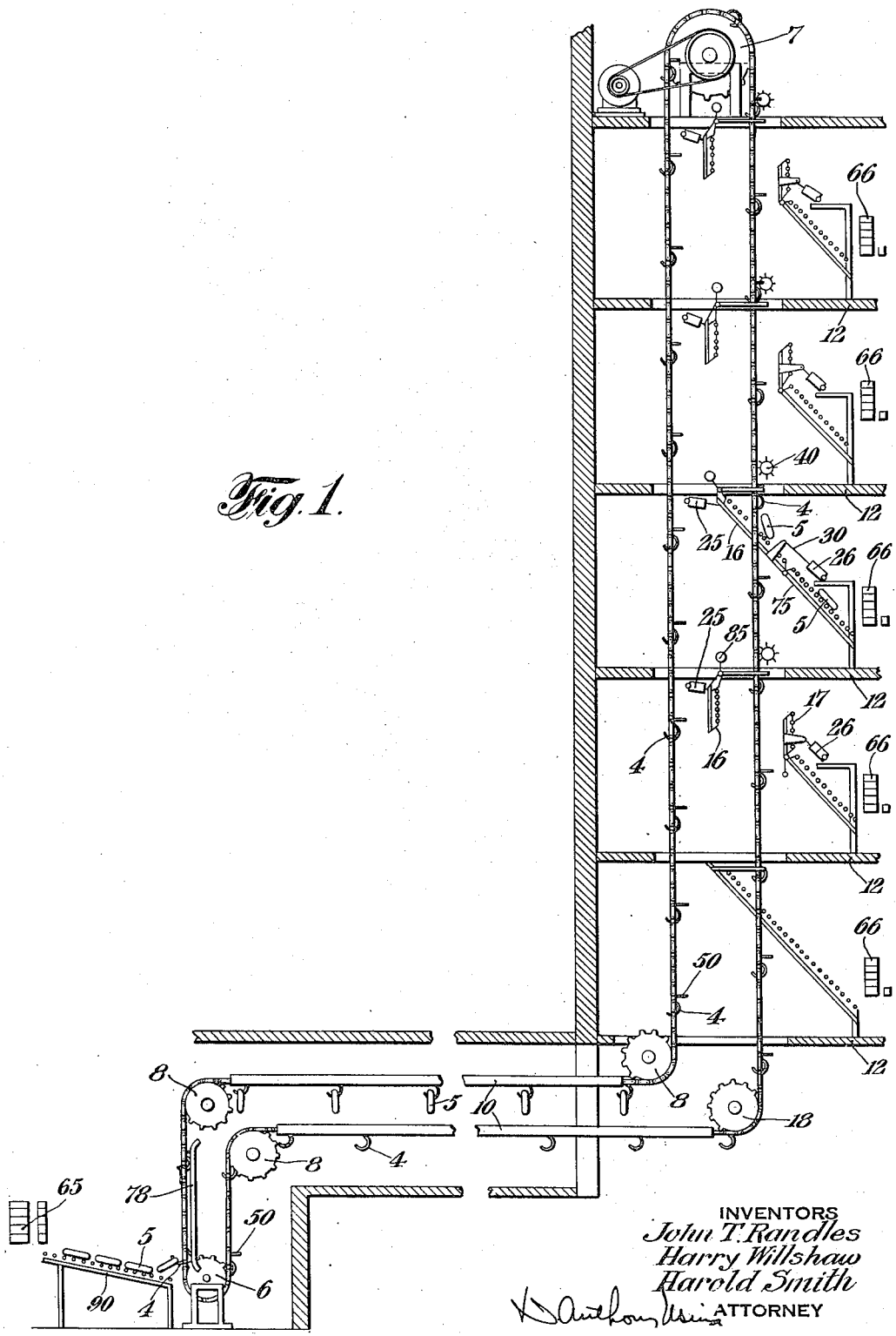

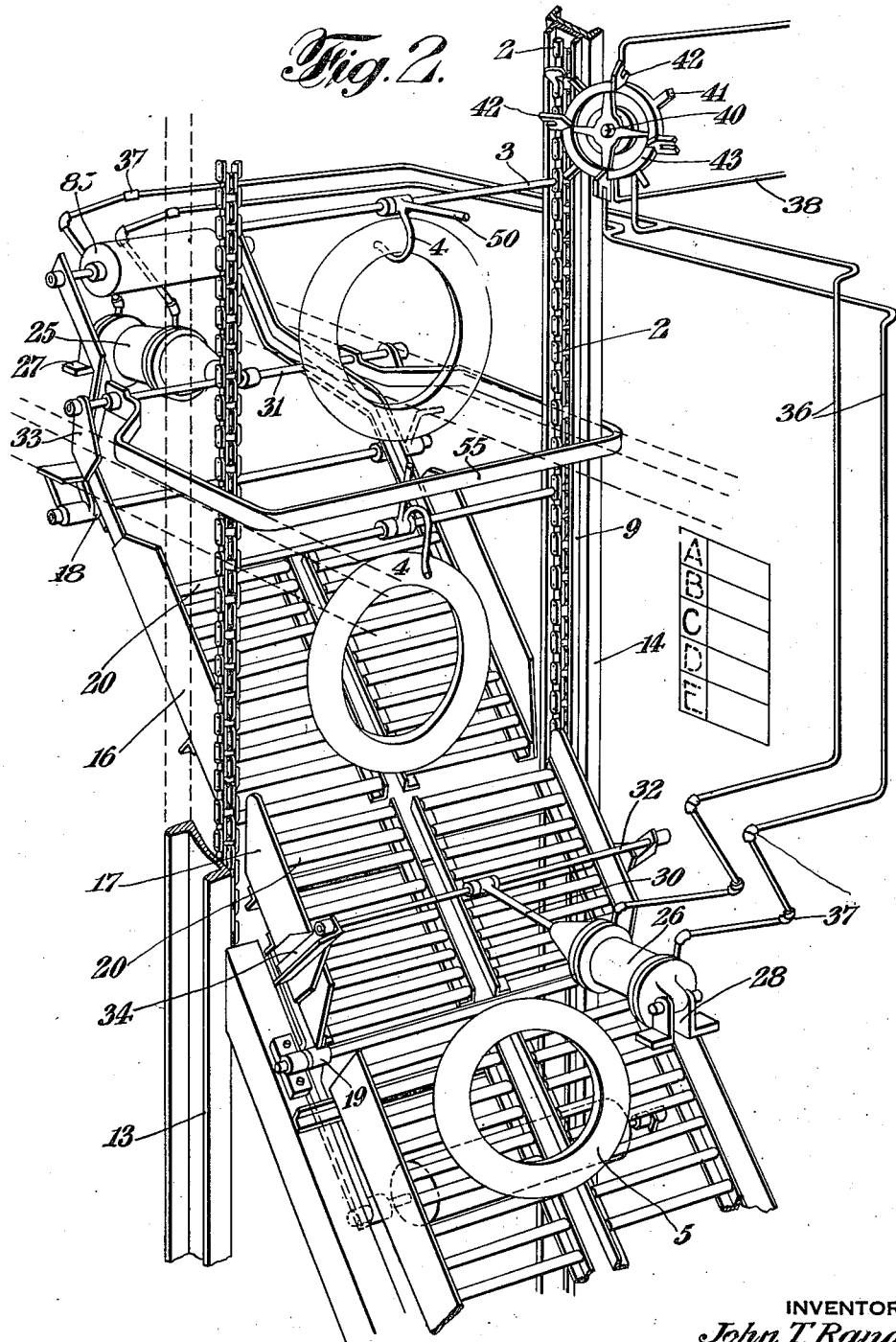

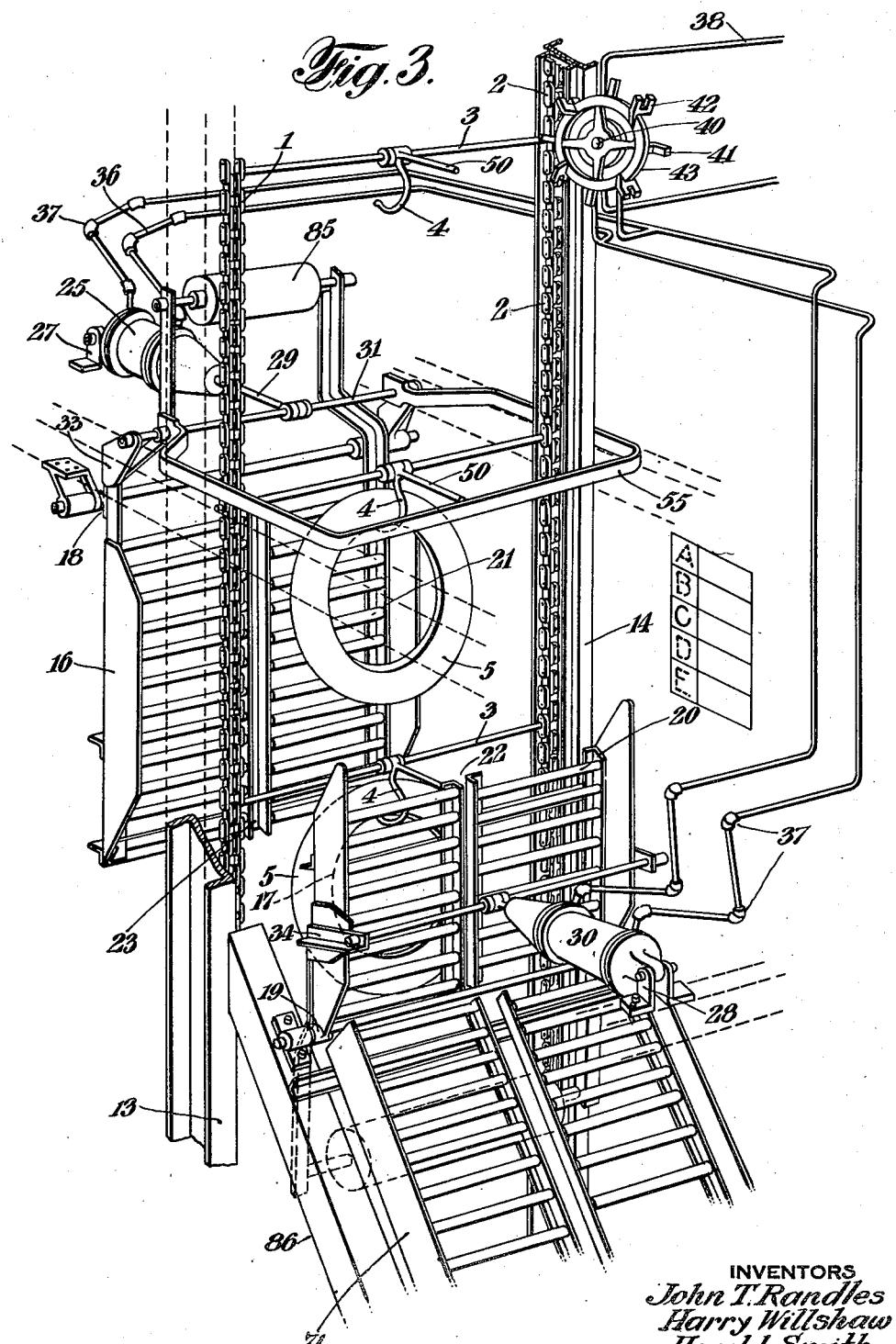

1,735,443

UNITED STATES PATENT OFFICE

JOHN THOMAS TURNEY RANDLES, HARRY WILLSHAW, AND HAROLD SMITH, OF ERDINGTON, ENGLAND, ASSIGNORS TO DUNLOP TIRE & RUBBER CORPORATION, OF BUFFALO, NEW YORK, A CORPORATION

CONVEYER SYSTEM

Application filed January 17, 1929, Serial No. 333,128, and in Great Britain January 13, 1928.

This invention relates to endless chain conveyers and has particularly for its object the provision of means to facilitate the automatic removal of articles at positions predetermined by the loading operator, together with means for indicating respectively where they are to be and will be removed.

With conveyers, especially those adapted to transfer goods to and deliver them at distances away from the operator at the point of feeding, and especially when the goods pass out of the vision of the operator, it is necessary to have operators in attendance at points of vantage to ensure of the correct working, but this adds unduly to the cost of working. Further, where there are a number of removing devices along the course of the conveyer, which remove the goods as required, difficulties are met with inasmuch as it is necessary to see that all the goods intended for a particular depository have reached and have been removed by the removing device before another device can be brought into operation and before the goods can be conveyed, which results in loss of time.

According to this invention goods being transported by an endless conveyer or system from the location of a random supply to others determined by the operator, are removed from the conveyer by removing devices actuated automatically and controlled by "keys" placed upon the chains by the operator previous to the imposition of the goods, a different "key" being provided for each removing device.

By the adoption of such control means, goods of varied classifications may be conveyed at the same time and are presented in cyclic succession to the respective removing devices.

Conveyers according to this invention may be constructed in numerous ways as required by the lay-out of the store or warehouse, the goods being presented either sidewardly or perpendicularly to the removing devices. We find it more convenient however, to arrange the removing devices perpendicularly above one another to simplify the structure generally.

Examples of the constructional features of apparatus according to this invention are illustrated in the accompanying drawings wherein:—

Fig. 1 shows diagrammatically apparatus for transporting goods from the location of random supply to a store having a number of floors each of which is provided with a removing device, the removing devices being arranged perpendicularly above one another.

Fig. 2 is a detail view in perspective of one of the removing devices shown in its operative position.

Fig. 3 is another view of the removing device shown in its non-operative position.

Fig. 4 is a detail view of a modified guide at the location of the feeding point.

Fig. 5 is a detail view of the switchboard for controlling the indicators.

As shown in the drawings the apparatus comprises two endless chains 1—2 arranged parallel with one another and retained in spaced relationship by suitable distance rods 3, which serve also as the means for mounting retaining hooks or analogous devices 4 on which the articles 5 to be conveyed are secured. The chains are received upon sprocket wheels disposed at advantageous positions, there being two main sprocket wheels 6—7 which are located at the ends of the system and other sprocket wheels 8 located intermediately thereof. The chains if desired are supported in guides 9 and particularly where it is desired to traverse in the horizontal plane as at 10. The sprocket wheels and the guides may be mounted upon stanchions or supports which form the framework or skeleton of the apparatus as a whole.

It should be appreciated that the apparatus may be formed in any manner to suit the premises in which it is disposed, for instance, we may not if desired arrange the removing devices above one another or provide the horizontally imposed part shown at 10.

The store or depository shown in the drawings has a number of floors 12 each of which is provided with a removing device and for convenience we provide stanchions 13—14 that extend from floor to floor throughout the store.

The removing devices, each of which if desired is capable of fulfilling similar functions, namely or becoming operative or not, their functioning being totally independent of each other comprise a chute composed of two members 16—17 pivotally mounted at 18—19 respectively in any suitable manner to brackets upon the framework of the apparatus.

The members 16—17 shown are of the gravity rollerway type and have rollers 20 pivotally mounted upon the frame member 21. In their operative positions these chute members 16—17 are brought into longitudinal alignment to form a chute unit as a whole (see Fig. 2), the surface plane of which lies obliquely with respect to the centre line of the conveyer. It will be seen however, that the inner edges of the members 16—17 when in operable relation are spaced away from one another to provide an aperture between which the rods 5 may pass, each of the members 16—17 also being provided with apertures 22 to prevent fouling the hooks 4. In the non-operative position the members 16—17 are adapted to open moving substantially into the vertical plane and leave an aperture between them.

If desired, the rollers 20 in either or both of the members 16—17 may be dispensed with or alternatively each or both of the members may be formed as a plain platform of wood or other material, having of course, the apertures to prevent fouling the hooks.

Preferably the members 16—17 are moved into and retained in either the operative or non-operative positions by mechanical means energized by any power means which in the method adopted comprises the use of fluid pressure acting upon pistons within suitable cylinders 25—26 pivotally secured by brackets 27—28 to the framework. The connections between the piston and the members 16—17 are effected by tie rods 29—30 which form the stems of the pistons, and which pivotally engage rods 31—32 that are secured to brackets 33—34 mounted upon the members 16—17.

As shown in the drawings the fluid is conveyed to the cylinders 25—26 by pipes 36 having suitable points 37 to allow of them moving with the cylinders. Fluid is admitted to these pipes 36 through a valve from supply pipes 38.

In accordance with that feature of the invention whereby the removing devices are set in motion by a "key" upon the chain, the principle of the arrangement is such that the power supply to the cylinders 25—26 is controlled by a valve of the rotary type, which conveniently has a stem 40 with a number of projections or wards 41—42 maintained rigidly in relation to it. These wards 41—42 formed upon rim 43 united by spokes to a boss which is adapted to be retained upon the valve stem 40. As will be seen in the drawings the wards 41—42 are of different shape and are arranged in two series, those of one series alternating with those of the other and also are arranged for the series 41 to actuate the valve to close the removing devices, and the other series to open them. Preferably a separate valve is provided for each removing device and the wards of each are of different setting, being arranged so that the wards for closing any specific removing device can only be actuated by the respective "key", while each "key" operates to open all the removing devices apart from its respective valve. Of course, it should be understood that we may provide only one valve having the necessary wards arranged upon it in any suitable manner, also with the necessary fluid conveying pipes. The "keys" comprise a base part 60 having pegs 61 projecting therefrom and spaced apart for a distance equal to the pitch of the chain. Extending from the other side of the base part 60 is an arm 62 which terminates in an arm 63, which is adapted to contact the wards 41—42 of the valve. It must be appreciated that the "keys" may be formed in any other manner.

Associated with one of the parts of the hinged members of the chute is a bar 55 conveniently termed the "tripping bar" which coacts with the "trip" 50 for the purpose of tripping the rook 4 and allowing the article to fall therefrom, the bar in the construction being pivotally secured to the rod 31 and is retained or rested upon guides which permit of it having a slidable movement forwardly and backwardly, the movement being derived from motion obtained by the member 16 when being swung into position.

The principle of the removing device is such that when it is desired to remove articles from the conveyer, the hinged chute members 16—17 are brought into longitudinal alignment through the medium of the mechanical devices, and the "tripping bar" 55 is drawn backwardly towards the conveyer to a position where it may coact with the "trip" 50. In this position the "tripping bar" tilts the hook 4 allowing the article 5 to fall, whereupon the article is precipitated down the chute. In its other position and when it is not desired to remove the articles from the conveyer, the "tripping bar" is forced forwardly by the openly moving chute members and is caused to assume a position where it will not coact with the "trip".

Another feature of this invention is to provide means to indicate the removing device in operation, and in the drawings we illustrate devices comprising a master indicator 65 placed at the feeding position and sub-indicators 66 at each of the discharging positions. Each of the indicators has clearly designated upon it all of the removing positions where there are sub-indicators; these indicators are interwired and controlled by switches in any suitable manner.

As an example of the arrangement of the indicators, let it be assumed that there are five removing devices then accordingly one master and five sub-indicators would be provided, a sub-indicator being located at each removing device and each of the indicators being marked in any suitable way to identify the removing devices. In the arrangement shown each of the indicators is marked with the references A, B, C, D, and E, the first letter corresponding with the first floor and the others progressing correspondingly with the other floors numerically, switches being provided and arranged so that those at the master indicator operate all the indicators while the switches at the sub-indicator operate only their respective parts of the indicators. If desired, the indicators may be adapted to give either or both audible and visible signals.

Conveniently, if desired, the "keys" for actuating the valves of the removing devices may be retained on the switchboard of the master indicator so that when they are removed therefrom the indicators are actuated, this being effected by arranging the "keys" on such devices so that upon their removal or replaceal switches are actuated and as shown diagrammatically in Fig. 5 the "keys" are adapted to be received upon the end of a spring 70 suitably insulated and adapted when the "key" is removed to contact with a terminal 71 thereby making the necessary circuit or alternatively or in combination with the arrangement may be electromagnets which operate the switches.

The operation of the apparatus as a whole is as follows:—

The operator having decided say, as shown in the drawings, to deliver the goods to the third floor, operates the switch to actuate the "C" sections of all the indicators, or removes the third floor "key" from the switch whereupon all the "C" sections are actuated which-ever switch means is provided. He then places the corresponding "key" upon the chains which afterwards are set in motion.

The articles may then be placed upon the hooks of the conveyer and they will be conveyed along the course of the conveyer up to the highest elevated removing device, whereupon they will travel "downwards" through the open removing devices i. e. those associated with the 4th and 5th floors and will be removed from the hooks of the conveyer by the removing device at the 3rd floor.

Upon the articles having been removed from the hooks they are precipitated down the chute and on to the platform or other members on which they are to be deposited. If required we may provide supplementary rollerway or other chutes to direct the articles away from the removing devices as represented at 75.

Preferably only one of the removing devices remains in its operative position at the same time.

This process can continue for any period and till such time when another "key" is substituted, when the previously described procedure will be repeated with the exception of opening the chute at which the articles were delivered previously and actuating its respective removing device.

It is not to be construed that we limit the apparatus to the precise construction hereinbefore described, we may modify it in any suitable manner without departing from the scope of the invention, for instance, we may open or close the chute members by means other than by compressed air or steam, and as an instance we may utilize an electrically or otherwise propelled winch with which chains are connected; alternatively a screw threaded rod may be advantageously applied, or further we may use the movement between the "key" and a lever fulcrumed to the framework and secured to other linkage to actuate the chute members.

Further, if desired, we may not provide an individual mechanical actuating means for each member of the chute, but interconnect them by links or chains and only mechanically actuate one member, arranging the links or chains so that the weight of one member may be used to counterbalance the other.

Preferably, means are provided at the loading point and each of the removing devices for stopping the conveyer and the operation of the devices, but means for starting it are arranged only near the loading point, such means taking the form of switches or levers of the form necessary for the type of driving device provided.

In a further manner of constructing the chute, instead of hinging the members as previously described we may dispose them in guides and provide means for moving them towards or away from one another, either in longitudinal or lateral directions or both, means of the kinds previously described being adapted to perform this.

In the foregoing apparatus all the removing devices are described as being capable of assuming operative and non-operative positions, we may however, modify this arrangement without defeating the correct functioning, as for instance, by dispensing with the operating means of the lowermost removing device and provide a chute and a corresponding "tripping bar" 91 which are permanently set in the operative positions.

Another feature in the construction of the apparatus is the provision of a guide or analogous means located near and adapted to coact with the hooks 4 at the position where the articles 5 are placed upon the conveyer, such guide preventing the hooks from pivoting and discharging the articles at this position.

The guide may consist of a metal member 78 of channel formation as shown in Fig. 1 or alternatively a member as shown in Fig. 4 may be advantageously utilized, the member comprising an endless belt 80 mounted upon rollers 81 and having lateral projections 82 for engaging the "trip" 50 of the hook. A stationary flat element 83 is disposed behind the forward extension of the belt.

Compacted elements are shown at 85—86 mounted rigidly in relation to the chute members 16—17. These elements constitute weights for counterbalancing the members.

While in the foregoing no specific reference has been made to the manner in which the articles are placed upon the conveyer it must be appreciated that we should adopt the most convenient method, for instance, for bulky goods it may be more convenient to attach them manually, but when the articles permit of it as in the case of the goods shown, we arrange for them to be attached automatically and to effect this we provide at the point of feeding a gravity rollerway 90 which traverses the articles towards the conveyer and causes them to be "taken up" by the hooks 4.

Apparatus constructed according to this invention can be advantageously utilized for transporting a number of different articles, but is particularly adapted for conveying tires.

Various modifications may be made without departing from the invention as defined in the appended claims.

We claim—

1. A conveyer as set forth in the specification comprising a travelling member including a pair of endless members retained in spaced relationship by rods located at intervals, said spacing rods having hooks pivotally mounted upon them for receiving the goods, means for rocking said hooks to discharge the goods therefrom and pivotally mounted roller carrying members arranged on opposite sides of said travelling member adapted to be swung to a position oblique thereto to convey by gravity the goods discharged from said hooks.

2. A conveyer comprising an endless member carrying pivotally mounted hooks for retaining the goods, said hooks having a projecting part constituting a trip, means to rock the hooks to effect the discharge of the goods therefrom, a chute disposed obliquely of said conveyer member and having swingable sections, means for swinging the latter sections substantially into alignment with said obliquely disposed chute and trip actuating means actuated upon movement of said swingable sections.

3. Conveyers according to claim 2 wherein the means for engaging the trip of the hook to effect the discharge of the goods therefrom comprises a tripping bar that is operatively connected to one of said swingable sections substantially as described.

4. In combination with a conveyer of the kind described having swingable hooks, means to direct the goods away from said conveyer after having been discharged from the hooks, said means comprising a gravity conveyer unit disposed obliquely of the conveyer including swingable sections, power means for swinging said sections and means carried by the conveyer for controlling the operation of said swingable sections.

5. In combination with a conveyer carrying swingable hooks, two hinged members arranged to be swung to jointly produce a single unit the plane of which is disposed obliquely with respect to and intersects the path traversed by the conveyer hooks, means for swinging said members and means operable upon the swinging movement of said members for swinging said hooks.

6. Conveyers as set forth in claim 5 wherein the hinged directing members when in the operable position jointly form a chute member as a whole, the plane of which lies obliquely with respect to the path traversed by the conveyer and the adjoining edges of which are spaced away from one another, and have apertures therein to prevent fouling the hooks.

7. Apparatus as set forth in claim 5 including power operated means controllable by devices operatively associated with the conveyer for moving the hinged members.

8. Conveyers according to claim 5 wherein the hinged members are moved by fluid pressure actuated devices, a valve, arranged to be actuated by a member securable to the conveyer, said valve being arranged to control said fluid pressure actuated devices.

9. In combination with a substantially vertical conveyer, means to direct the articles in their removal from the conveyer comprising a pair of rollerway chute members hinged one at the top and the other at the bottom horizontal edges to permit of them being swung into alignment to produce a unit as a whole, the surface plane of which lies obliquely with respect to the centre line of the conveyer, swingable hooks carried by the conveyer and having trips secured thereto, means movable into position for coaction with said trips upon movement of said rollerway chute members to their oblique positions, power means for actuating said rollerway chute members and means controlling the operation of said power means.

In witness whereof, we have hereunto signed our names.

JOHN THOMAS TURNEY RANDLES.
HARRY WILLSHAW.
HAROLD SMITH.